(12) United States Patent
Aaron et al.

(10) Patent No.: US 8,478,531 B2
(45) Date of Patent: *Jul. 2, 2013

(54) DIP-BASED CORRECTIONS FOR DATA RECONSTRUCTION IN THREE-DIMENSIONAL SURFACE-RELATED MULTIPLE PREDICTION

(75) Inventors: Peter A. Aaron, Katy, TX (US); Roald G. van Borselen, Voorschoten (NL); Robertus F. Hegge, Rijswijk (NL); Simon R. Barnes, Mortimer (GB)

(73) Assignee: PGS Geophysical AS, Lysaker (NO)

( * ) Notice: Subject to any disclaimer, the term of this patent is extended or adjusted under 35 U.S.C. 154(b) by 547 days.

This patent is subject to a terminal disclaimer.

(21) Appl. No.: 12/798,594

(22) Filed: Apr. 7, 2010

(65) Prior Publication Data

US 2011/0178715 A1    Jul. 21, 2011

Related U.S. Application Data

(63) Continuation-in-part of application No. 12/657,412, filed on Jan. 20, 2010, now Pat. No. 8,126,652.

(51) Int. Cl.
| | |
|---|---|
| G01V 1/28 | (2006.01) |
| G01V 1/36 | (2006.01) |
| G01V 1/00 | (2006.01) |
| G06F 19/00 | (2006.01) |

(52) U.S. Cl.
USPC .............. 702/11; 73/865.8; 367/53; 367/72; 702/17; 702/187; 702/189; 708/105; 708/200

(58) Field of Classification Search
USPC . 73/152.01, 152.02, 432.1, 865.8; 166/244.1, 166/250.01, 254.1; 175/40, 50; 181/101; 324/323; 367/14, 37, 38, 43, 50, 51, 52, 53, 367/68, 72; 702/1, 2, 5, 6, 10, 11, 14, 17, 702/85, 104, 127, 187, 189, 190, 191; 708/100, 708/105, 200, 300, 400
IPC ..................... G01V 1/00,1/24, 1/28, 1/30, 1/32, G01V 1/36; G06F 11/00, 11/30, 11/32, 17/00, G06F 17/40, 19/00
See application file for complete search history.

(56) References Cited

U.S. PATENT DOCUMENTS

| | | | | |
|---|---|---|---|---|
| 6,889,142 | B2 * | 5/2005 | Schonewille | 702/17 |
| 7,257,492 | B2 * | 8/2007 | Moore | 702/17 |

(Continued)

FOREIGN PATENT DOCUMENTS

| | | |
|---|---|---|
| EP | 1665844 B1 | 7/2007 |
| EP | 1735640 | 12/2008 |

(Continued)

OTHER PUBLICATIONS

Moore et al: "3D surface-related multiple prediction (SMP): A case history", The Leading Edge, Mar. 2005, pp. 270-274 and 284.*

(Continued)

*Primary Examiner* — Edward Cosimano (57) ABSTRACT

A best fitting trace in seismic data is determined for a desired trace to be reconstructed. A dip-based correction is calculated per trace and per sample for differences in azimuth, common midpoint coordinates, and offset between the best fitting trace and the desired trace. The dip-based correction is applied to the best fitting trace to reconstruct the desired trace for 3D surface-related multiple prediction.

15 Claims, 3 Drawing Sheets

U.S. PATENT DOCUMENTS

| | | | |
|---|---|---|---|
| 8,126,652 B2* | 2/2012 | Aaron et al. | 702/14 |
| 2004/0243312 A1* | 12/2004 | Schonewille | 702/14 |
| 2007/0073488 A1* | 3/2007 | Moore | 702/14 |
| 2008/0043573 A1 | 2/2008 | Bisley et al. | |
| 2011/0178712 A1* | 7/2011 | Aaron et al. | 702/5 |

FOREIGN PATENT DOCUMENTS

| | | |
|---|---|---|
| RU | 2333515 | 9/2008 |
| RU | 2339056 | 11/2008 |

OTHER PUBLICATIONS

Kumari et al: "3D Surface-Related Multiple Elimination: Some Techniques", 6th International Conference & Exposition on Petroleum Geophysics "Kolkata 2006" 2006, pp. St-56 through St-61.* van Borselen et al: "True-Azimuth 3D surface-Related Multiple Elimination", peas news resources, Feb./Mar. 2009 Issue No. 98, (downloaded from pesa.com.au/publications/pers_news/feb_mar/09/persanews_9811.html on Apr. 19, 2011).*

Aaron P., et al., "Dip-dependent, corrections for data reconstruction in true azimuth 3D SRME", SEG Expanded Abstracts, vol. 29, 2010, p. 3411-3415.

Baumstein, A., et al., "3D surface-related multiple elimination: data reconstruction and application to field data", GSEG US, vol. 71, No. 3, 2006, p. E26-E30.

Aaron P., et al., "Data regularization for 3-D SRME: A comparison of methods", SEG Expanded Abstracts, vol. 26, 2006, p. 1987-1991.

Schneiderbauer, K., European Search Report, Completion Date of Search: May 11, 2011.

Levin, F.K.,"Apparent velocity from dipping interface reflections",Geophysics, vol. 36, No. 3, Jun. 1971, p. 510-516.

Van Dedem et al., "3D surface-related multiple elimination and interpolation", 68th SEG Intnl. Exb. & Ann. Mtg., Exp. Abstr., vol. 98, 1998, p. 1321-1325.

Chemingui, N. et al., "Handling azimuth variations in mullt-streamer marine surveys", 70th SEG Intnl. Exb. & Ann. Mtg., Exp. Abstr., vol. 1, Aug. 2000, p. 1-4.

Schonewille, M.A. et al., "A general reconstruction scheme for domonant azimuth 3D seismic data", Geophysics, vol. 68, No. 6, Nov.-Dec. 2003, p. 2092-2105.

L.I. Popova, Eurasian Search Report, Mailing Date: Jun. 21, 2011.

* cited by examiner

DIP-BASED CORRECTIONS FOR DATA RECONSTRUCTION IN THREE-DIMENSIONAL SURFACE-RELATED MULTIPLE PREDICTION

CROSS-REFERENCES TO RELATED APPLICATIONS

This application is a continuation-in-part (CIP) of U.S. patent application Ser. No. 12/657,412 filed on Jan. 20, 2010, now U.S. Pat. No. 8,126,656.

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of surface related multiple prediction in marine seismic surveys.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time. The image of the structure of the Earth's subsurface is produced in order to enable an interpreter to select locations with the greatest probability of having petroleum accumulations.

In a marine seismic survey, seismic energy sources are used to generate a seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) and recorded.

The appropriate seismic sources for generating the seismic signal in marine seismic surveys typically include a submerged seismic source towed by a ship and periodically activated to generate an acoustic wavefield. The seismic source generating the wavefield is typically an air gun or a spatially-distributed array of air guns.

The appropriate types of seismic sensors typically include particle velocity sensors (known in the art as geophones) and water pressure sensors (known in the art as hydrophones) mounted within a towed seismic streamer (also known as a seismic cable). Seismic sensors may be deployed by themselves, but are more commonly deployed in sensor arrays within the streamer.

After the reflected wave reaches the seismic sensors, the wave continues to propagate to the water/air interface at the water surface, from which the wave is reflected downwardly, and is again detected by the sensors. The reflected wave continues to propagate and can be reflected upwardly again, by the water bottom or other subterranean formation interfaces. Reflected waves that reflect more than once are termed "multiples" and are typically treated as noise. A particular category of noise comprises multiples that reflect at least once from the water surface and are called surface-related multiples.

Three-dimensional surface-related multiple prediction (3D SRMP), a process to estimate surface-related multiples in seismic data, is a part of 3D surface-related multiple elimination (3D SRME), which strives to attenuate the surface-related multiples by a prediction-subtraction process. The surface-related multiples are first predicted from the seismic data and then the predicted multiples are subtracted from the seismic data to leave a noise-attenuated signal. A first step in this process comprises constructing a multiple contribution gather for a source-receiver trace, which involves the computation of the convolution of pairs of traces over a spatial area. A second step comprises constructing a predicted multiple trace which contains primarily multiple reflections, which involves stacking all the multiple contribution traces belonging to the source-receiver trace. A third step comprises subtracting the predicted multiple traces from the original seismic data.

Thus, the process of predicting 3D surface-related multiples from seismic data, for the combination of a specific source and a specific receiver location, consists of accumulating the results of convolving traces in pairs over a surface area of possible linkage locations. Typically, however, not all pairs of traces to be convolved at all linkage locations are always readily available from seismic data acquisition. This is due to the under-sampling of source and receiver positions, especially in the cross-line direction, that is inherent in marine seismic data acquisition using towed streamers. Furthermore, practical limitations in positioning and navigation systems, as well as wave currents that cause feathering of the streamers and source configuration, prohibit that sources and receivers are positioned exactly where they are desired.

Several methods exist that aim to regularize data in order to reconstruct missing data. These methods may be applied to generate data for 3-D surface-related multiple prediction. These methods known to the industry are based on NMO (Normal Moveout), full DMO (Dip Moveout)—Inverse DMO, AMO (Azimuth Moveout), or migration operators. These methods have in common that they aim to generate new data from the acquired data that are more similar to the desired traces.

Thus, a need exists for a method for data reconstruction to generate desired traces from the set of acquired traces, in order to achieve more accurate 3D surface-related multiple prediction.

BRIEF SUMMARY OF THE INVENTION

The invention is a method of dip-based corrections for data reconstruction in 3D surface-related multiple prediction. A best fitting trace in seismic data is determined for a desired trace to be reconstructed. A dip-based correction is calculated per sample for differences in azimuth, common midpoint coordinates, and offset between the best fitting trace and the desired trace. The corrections are applied to the best fitting trace to reconstruct the desired trace for 3D surface-related multiple prediction.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

In general, the invention is a method for transforming seismic data into noise-attenuated data. In particular, the invention is a method for seismic data reconstruction using dip-based corrections for surface-related multiple prediction schemes. The invention is used in the prediction phase of a 3D prediction-subtraction process to attenuate surface-related multiples in seismic data. The process of predicting 3D surface-related multiples from seismic data comprises accumulating the results of convolving pairs of traces over a surface area of possible linkage locations for each combination of a selected source location and a selected receiver location.

Figure 1:
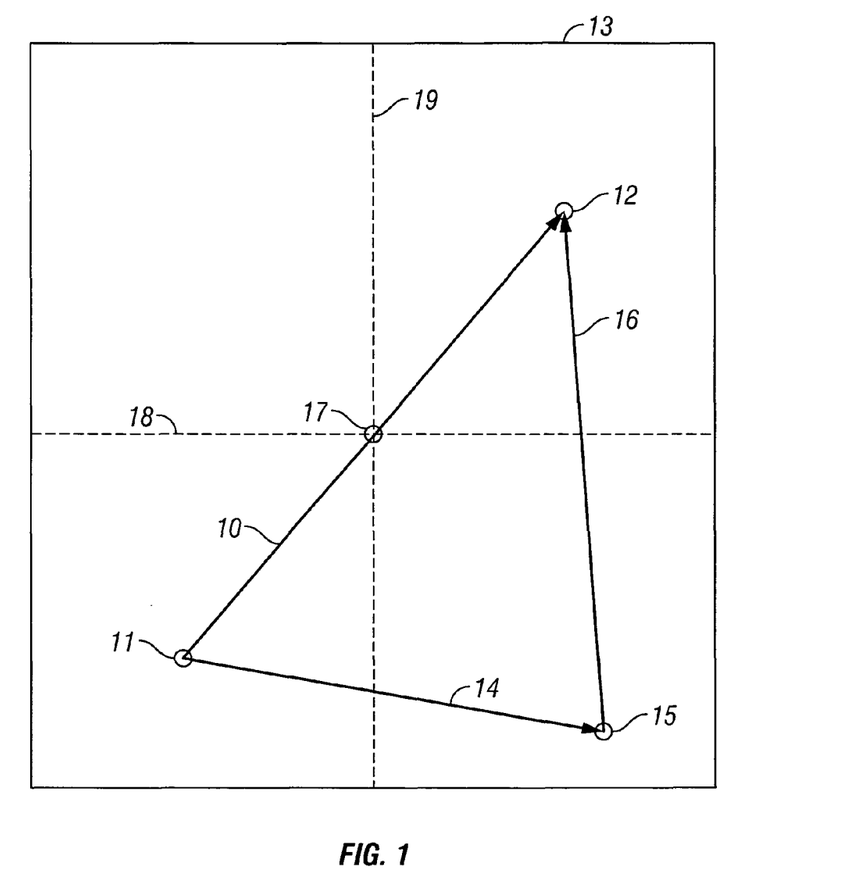
FIG. 1 is a schematic diagram of traces for data reconstruction for 3D surface-related multiple prediction, as in the method of the invention.

FIG. 1 is a schematic diagram of traces for data reconstruction for 3D surface-related multiple prediction, as in the method of the invention. The location at which surface-related multiples are to be predicted (and subtracted) is determined by a source-receiver trace 10. A source-receiver trace 10 is given by a combination of a selected source location 11 and a selected receiver location 12. The process of predicting the surface related multiples from seismic data for this source-receiver trace 10 comprises convolving pairs of traces and then accumulating the convolution results over a surface area 13. The first trace in each pair of convolved traces is called a source-side linkage trace 14 and has a source location at the selected source location 11 of the source-receiver trace 10 and has a receiver location at a selected linkage location 15. The second trace 16 in the pair is called a receiver-side linkage trace 16 and has its source location at the same selected linkage location 15 and has a receiver location at the selected receiver location 12 of the source-receiver trace 10.

The linkage locations 15 for all pairs of source-side linkage traces 14 and receiver-side linkage traces 16 are distributed over the surface area 13. Each linkage location 15 corresponds to a potential surface reflection point of the surface related multiples associated with this source-receiver trace 10. The traces created by the convolution of the pairs of source-side linkage traces 14 and receiver-side linkage traces 16 are referred to as multiple contribution traces and the ensemble of these multiple contribution traces (before accumulation) is referred to as a multiple contribution gather. The accumulation of the multiple contribution traces into the predicted surface related multiples comprises a process commonly known as Fresnel stacking. The extent or coverage in the surface area 13 of the surface reflection points as incorporated (after accumulation) in the prediction is commonly referred to as the aperture of the prediction.

The aperture can be chosen as the simplest case, a rectangular surface area 13 surrounding the midpoint 17 of the source-receiver trace 10 for the specific source location 11 and specific receiver location 12. The rectangular surface area 13 can be parameterized by an inline direction 18 and a cross-line direction 19. However, the surface area 13 of the aperture does not have to be a rectangular area or oriented in the inline 18 and cross-line directions 19. This is not a limitation of the invention, but merely employed for simplicity of illustration.

However, as discussed above in the Background section, not all pairs of traces to be convolved at all linkage locations are always readily available from marine seismic data acquisition. The invention is a method for seismic data reconstruction by means of dip-based corrections to solve this problem. The required dip information relates to the local geology and can either be predetermined or determined during the data reconstruction.

A conventional approach is to reconstruct the desired traces from the nearest traces in the acquired seismic data. The seismic data is expressed as ($x^{CMP}$, $y^{CMP}$, h, $\phi$, t), where the acquired seismic data is transformed to this format, if necessary. CMP (Common Midpoint) defines the x and y positions of the location mid-way between the source and receiver locations for the trace and will be referred to as the CMP coordinates. Here, x and y are orthogonal coordinates in a processing grid, typically oriented so that x is in the inline direction and y is in the cross-line direction of the seismic survey, although this orientation can be user-defined. Azimuth, $\phi$, is here defined as the angle between the direction of data acquisition (typically, sail line direction in marine data acquisition) and the straight line between the source and receiver locations. Offset, h, is defined as the total distance between the source and receiver location for the individual trace. Arrival time, t, is the time an event is recorded on the trace.

In this method, the desired trace is selected as the best available trace that minimizes the difference between the best fitting (nearest) and the desired trace. The difference $\Phi$ is a weighted sum of the differences in CMP x and y positions, offset h, and azimuth $\phi$ between the nearest and desired traces, which can be expressed as $$\Phi = \alpha |x_b^{CMP} - x_d^{CMP}| + \alpha |y_b^{CMP} - y_d^{CMP}| + \beta |h_b - h_d| + \epsilon |\phi_b - \phi_d|, \quad (1)$$

where $\alpha$, $\beta$ and $\epsilon$ are user-defined weights, and subscripts b and d denote best fitting and desired traces, respectively.

Unfortunately, for the reasons stated above, the desired trace with the correct CMP x and y positions, offset h, and azimuth φ is often not present in the set of acquired traces. Conventional data acquisition often aims at a distribution of sources and receivers such that at each CMP bin, which contains a small range of CMP x and y locations, and offset bin, which contains a small range of offsets h, one trace is available. In this case, only one azimuth φ is available for the given CMP bin, and offset bin combination. However, the minimization of Equation (1) is not restricted to a single CMP bin and offset bin combination. Further, certain modern data acquisition geometries aim at having more than one trace available at such a CMP bin, and offset bin location. In these cases, more than one trace is available, each with their own azimuth φ, for each CMP bin and offset bin combination.

This means that in conventional practice, the best fitting trace is found by minimizing the difference Φ as a weighted sum of differences in CMP x and y, and offset h only, thereby ignoring azimuth φ. Thus, Equation (1) is applied as the shortened version:

$$\Phi = \alpha|x_b^{CMP} - x_d^{CMP}| + \alpha|y_b^{CMP} - y_d^{CMP}| + \beta|h_b - h_d|, \quad (2)$$

without the final difference term in azimuth φ.

After finding the best fitting, or nearest, trace, a differential move-out is applied to this data trace in order to correct for the offset difference between the desired trace and the best fitting trace. This differential move-out operator only corrects for offset differences; it cannot correct for the difference in azimuth, the difference in CMP coordinates x and y, or for dip-dependent timing differences related to offset, between the desired trace and the best fitting trace.

Figure 2:
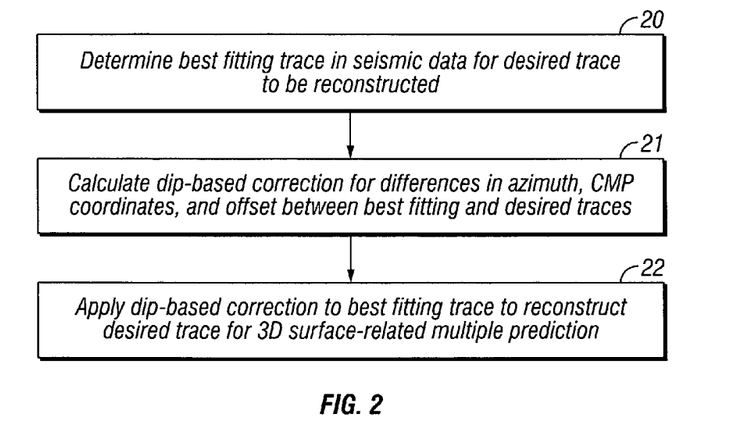
FIG. 2 is a flowchart illustrating an embodiment of the invention for a dip-based correction for data reconstruction for 3D surface-related multiple prediction.
Figure 3:
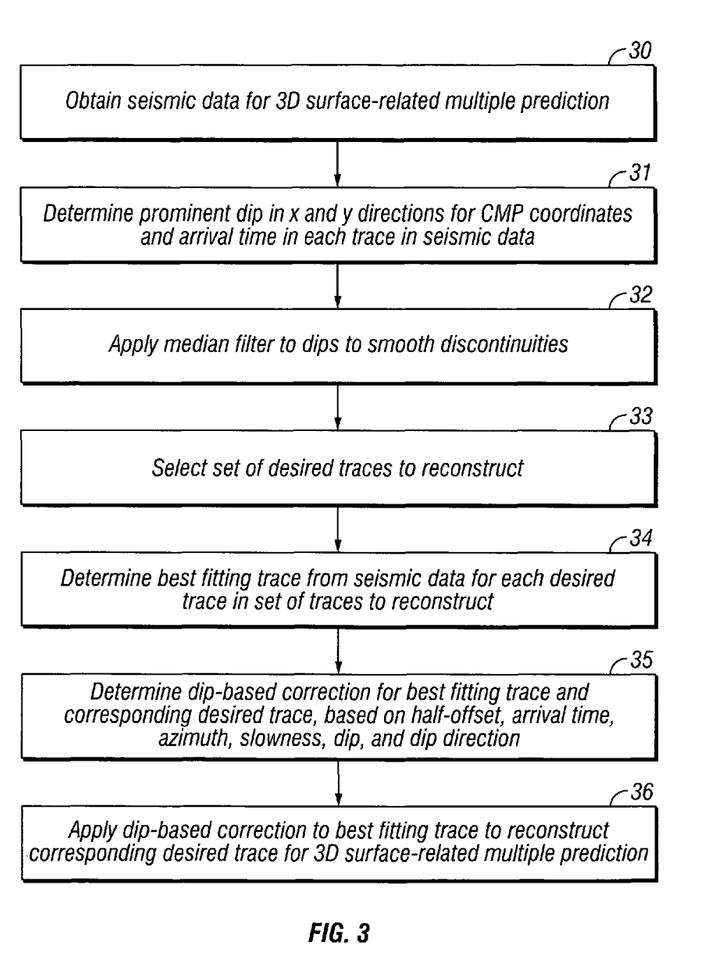
FIG. 3 is a flowchart illustrating another embodiment of the invention for a dip-based correction for data reconstruction for 3D surface-related multiple prediction.

The invention is a method to incorporate dip-based corrections determined and applied per trace and per sample for azimuth, CMP coordinates, and offset related differences between the desired trace and the best fitting trace in the data reconstruction scheme described above. The best fitting trace is found, corrections are computed for the desired and best fitting traces based on local dip information, and the corrections are then applied to the best fitting trace at each sample. The local dip information relates to the local geology and is either predetermined or determined during the application of the reconstruction scheme from the locally available data. Because the corrections are determined and then applied per trace, and per sample, the method of the invention becomes computationally very efficient. The method of the invention is thus fundamentally different from the data regularization approach described in the Background section. The method of the invention is utilized to apply dip-based corrections during data reconstruction for 3-D surface-related multiple prediction:

FIGS. 2-3 show flowcharts illustrating embodiments of the invention for a dip-based correction for data reconstruction for 3D surface-related multiple prediction. FIG. 2 is a flowchart illustrating a general embodiment of the invention. FIG. 3 is a flowchart illustrating a more detailed embodiment of the invention FIG. 2 is a flowchart illustrating an embodiment of the invention for dip-based correction for data reconstruction for 3D surface-related multiple prediction.

At block 20, a best fitting trace is determined for a desired trace to be reconstructed.

At block 21, a dip-based correction is calculated for the differences in azimuth, CMP coordinates, and offset between the best fitting trace and the desired trace. The correction is calculated for each sample on the traces.

At block 22, the dip-based correction is applied to the best fitting trace to reconstruct the desired trace for 3D surface-related multiple prediction.

FIG. 3 is a flowchart illustrating another embodiment of the invention for dip-based correction for data reconstruction for 3D surface-related multiple prediction. FIG. 3 is a more detailed embodiment of the method of the invention discussed with reference to the flowchart in FIG. 2.

At block 30, marine seismic data is obtained in a ($x^{CMP}$, $y^{CMP}$, h, φ, t) format, where the acquired seismic data is transformed to this format, if necessary.

At block 31, for each data sample from block 30, with CMP coordinates $x^{CMP}$ and $y^{CMP}$ and time sample t, the predominant dip in the x and y directions is determined. The dips can be determined by any appropriate method known in the art. The dips can be determined from any appropriate subset of the total acquired data volume, such as, for example, from common offset volumes. These determinations generate a dip-estimate volume.

Dip is the slope between two adjacent traces in the gather of the same seismic event. The dip is measured as a ratio between a time difference and a space difference (analogous to dt/dx). The dip is typically decomposed into two components, oriented along the x and y axes of the processing grid being used. Although a dipping event is generally meant to be non-horizontal, a horizontal event is not excluded.

The method of the invention is not restricted by a need to estimate dips for each desired trace to be reconstructed. In an alternative embodiment, dip estimation may be applied on a sparse grid where dip estimates for intermediate positions are obtained by interpolating dip estimates acquired on the sparse grid.

In another alternative embodiment, a finite number of predominant dips may be estimated for any data sample. This multiple dip estimation can be achieved by separating different dip components prior to dip estimation using well-known methods like f-k (frequency-wavenumber) or Radon filtering, or by utilizing well-known dip-decomposition methods, such as slant-stack filtering. The final dip-based correction to be applied will then be a weighted sum of the individual corrections for each dip.

At block 32, a filter, for example a median filter, is applied to the dip-estimate volume from block 31 to smooth discontinuities, if desired. This step is optional.

At block 33, a set of traces to reconstruct is selected. This set of traces comprises the traces that require reconstruction to obtain desired traces for 3-D surface-related multiple prediction.

At block 34, for each of the traces in the set of traces from block 33, a best fitting trace from the seismic data from block 30 is determined. In one embodiment, this best fitting trace is determined by application of Equation (2). However, this is not a restriction of the invention. In another embodiment, a trace from the seismic data from block 30 is determined that is close to the trace to be reconstructed, but not necessarily a best fitting trace until after the dip-based correction is applied in block 36 below.

At block 35, a dip-based correction is determined for the desired trace from block 33 and the best fitting trace from block 34. The dip-based correction represents the difference between the best fitting trace from block 34 and that of the desired trace to be reconstructed from block 33. The correction is applied to each time sample t in the best fitting trace from block 34. As discussed above, the correction can be a weighted sum of corrections for each dip at the data sample.

In one embodiment, a dip-based correction for azimuth differences is determined based upon half-offset, arrival time, azimuth, slowness, CMP coordinates, dip and dip direction. In one embodiment, the azimuth correction $\Delta t_\phi$ used is given by:

$$\Delta t_\phi = -\frac{(h')^2}{2t}|p|^2 \sin(\phi_b - \phi_d)\sin(\phi_b + \phi_d - 2p_\theta), \quad (3)$$

with magnitude of slowness p given by:

$$|p| = \sqrt{\left(\frac{dt}{dx}\right)^2 + \left(\frac{dt}{dy}\right)^2} \quad (4)$$

and slowness direction $p_\theta$ given by:

$$p_\theta = \cos^{-1}\left(\frac{\frac{dt}{dx}}{|p|}\right), \quad (5)$$

where h' is half-offset, t is the arrival time, p is slowness, $\phi_b$ is the azimuth of the best fitting trace, $\phi_d$ is the azimuth of the desired trace, dt/dx is the local dip along the x coordinate and dt/dy is the local dip along the y coordinate.

In another embodiment, a dip-based correction for offset differences is determined based upon half-offset, arrival time, azimuth, slowness, dip and dip direction. In one embodiment, the offset correction $\Delta t_h$ is given by:

$$\Delta t_h = \frac{2h'_d \Delta h'}{t}|p|^2 \cos^2(\phi_d - p_\theta) \quad (6)$$

where $h'_d$ is the half-offset of the desired trace and $\Delta h' = h'_b - h'_d$ is the difference between the half-offsets of the best fitting trace and the desired trace.

In another embodiment, a dip-based correction for CMP location differences is determined based upon the CMP coordinates, slowness, dip and dip direction. In one embodiment, the CMP location correction $\Delta t_{cmp}$ used is given by:

$$\Delta t_{cmp} = |p|(\Delta x^{CMP} \cos(p_\theta) + \Delta y^{CMP} \sin(p_\theta)) \quad (7)$$

with the CMP x coordinate difference $\Delta x^{CMP}$ given by:

$$\Delta x^{CMP} = x_b^{CMP} - x_d^{CMP}, \quad (8)$$

and the CMP y coordinate difference $\Delta y^{CMP}$ given by:

$$\Delta y^{CMP} = y_b^{CMP} - y_d^{CMP}. \quad (9)$$

In another embodiment, the dip-based correction used is determined from a combination of the corrections for the individual differences between the best fitting trace and the desired trace.

At block 36, the dip-based correction from block 35 is applied to the best fitting trace from block 34 to reconstruct a corresponding desired trace for 3D surface-related multiple prediction. The correction factor is applied per trace and per sample, after the selection of the best fitting trace. As a result the method is computationally very efficient.

In addition, the dip-based correction as determined by the method of the invention is independent of wavefield propagation velocities, thus, no a priori knowledge of wavefield propagation velocities is required in Equations (3), (6) and (7) above. However, this velocity-independent approach is a possible advantage, but not a required limitation of the invention. In other embodiments, other equations could be derived that achieve the same effect, a dip-based correction, but would require more detailed subsurface information, such as wavefield propagation velocities. For example, the following equation could be applied to determine an azimuth correction $\Delta t_\phi$:

$$\Delta t_\phi = -\frac{2h'^2}{v^2 t_d} \sin^2(\psi)\sin(\phi_b - \phi_d)\sin(\phi_b + \phi_d, -2\theta), \quad (10)$$

where h' is half-offset, v is velocity of the medium, t is arrival time, $\psi$ is dip angle, $\phi$ is the source-receiver azimuth, and $\theta$ is dip direction. The subscripts b and d refer to best fitting and desired traces, respectively.

In another embodiment, the following equation could be applied to determine an offset correction $\Delta t_h$:

$$\Delta t_h = \frac{2}{v^2 t_d} 2h'_d \Delta h' \sin^2(\psi)\cos^2(\phi_d - \theta), \quad (11)$$

where $\Delta h' = h'_b - h'_d$ is the difference in half-offsets.

In another embodiment, the following equation could be applied to determine a CMP location correction $\Delta t_{cmp}$:

$$\Delta t_{cmp} = \left|\frac{2\sin(\psi)}{v}\right|(\Delta x^{CMP} \cos(\theta) + \Delta y^{CMP} \sin(\theta)), \quad (12)$$

where $\Delta x_{cmp}$ is the difference in the x coordinate between CMP locations and $\Delta y_{cmp}$ is the difference in the y coordinate between CMP locations.

In another embodiment, the following equation could be applied to determine a CMP location correction $\Delta t_{cmp}$:

$$\Delta t_{cmp} = \frac{4\sin(\psi)}{v^2 t_d} \sqrt{\frac{v^2 t_d^2}{4} + h'^2 \sin^2(\psi)\cos^2(\phi_d - \theta)} \quad (13)$$

$$(\Delta x^{CMP}\cos(\theta) + \Delta y CMP \sin\theta.$$

In another embodiment, the method of the invention can also be utilized in the process of predicting 3-D interbed multiples rather than surface-related multiples. In 3D IMP, (Interbed Multiple Prediction), a triplet of traces and two convolutions are used as part of the method, instead of two traces and a single convolution as in 3D SRMP. The method of the invention can be used to reconstruct the missing traces for each of the two convolutions.

The invention has been discussed above as a method, for illustrative purposes only, but can also be implemented as a system. The system of the invention is preferably implemented by means of computers, in particular digital computers, along with other conventional data processing equipment. Such data processing equipment, well known in the art, will comprise any appropriate combination or network of computer processing equipment, including, but not be limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

We claim:

1. A method for marine seismic data reconstruction for 3D surface-related multiple prediction using a programmable computer that is programmed to perform the following:
   determining a best fitting trace in the seismic data for a desired trace to be reconstructed;
   calculating a dip-based correction per sample for differences in azimuth, common midpoint coordinates, and offset between the best fitting trace and the desired trace; and
   applying the dip-based correction to the best fitting trace to reconstruct the desired trace for 3D surface-related multiple prediction.

2. The method of claim 1, wherein the calculating a dip-based correction comprises:
   calculating a dip-based correction for the best fitting trace and the corresponding desired trace, based upon half-offset, azimuth, arrival time, slowness, common midpoint coordinates, dip, and dip direction.

3. The method of claim 2, wherein the calculating a dip-based correction for azimuth differences comprises applying the following equation:

$$\Delta t_\phi = -\frac{(h')^2}{2t}|p|^2 \sin(\phi_b - \phi_d)\sin(\phi_b + \phi_d - 2p_\theta),$$

with $$|p| = \sqrt{\left(\frac{dt}{dx}\right)^2 + \left(\frac{dt}{dy}\right)^2}$$

and $$p_\theta = \cos^{-1}\left(\frac{\frac{dt}{dx}}{|p|}\right),$$

where h' is the half-offset, t is the arrival time, p is slowness, θ is dip direction, φ is source-receiver azimuth and subscripts b and d denote best fitting and desired traces, respectively.

4. The method of claim 2, wherein the calculating a dip-based correction for offset differences comprises applying the following equation:

$$\Delta t_h = \frac{2h'_d \Delta h'}{t}|p|^2\cos^2(\phi_d - p_\theta),$$

where h' is the half-offset, $\Delta h' = h'_b - h'_d$ is the difference in half-offsets, t is the arrival time, p is slowness, θ is dip direction, φ is source-receiver azimuth and subscripts b and d denote best fitting and desired traces, respectively.

5. The method of claim 2, wherein the calculating a dip-based correction for common midpoint location differences comprises applying the following equation:

$$\Delta t_{cmp} = |p|(\Delta x^{cmp}\cos(p_\theta) + \Delta y^{cmp}\sin(p_\theta)),$$

where p is slowness, θ is dip direction, $\Delta x^{cmp} = x_b^{cmp} - x_d^{cmp}$ is the difference in the x coordinate between common midpoint locations, $\Delta y^{cmp} = y_b^{cmp} - y_d^{cmp}$ is the difference in the y coordinate between common midpoint locations and subscripts b and d denote best fitting and desired traces, respectively.

6. The method of claim 1, wherein the determining a best fitting trace further comprising:
   obtaining seismic data in a ($x^{CMP}$, $y^{CMP}$, h, φ, t) format;
   determining a predominant dip in x and y directions for common midpoint coordinates $x^{CMP}$ and $y^{CMP}$ and arrival time t in each trace in the seismic data;
   applying a filter to the dips to smooth discontinuities;
   selecting a set of desired traces to reconstruct; and
   determining a best fitting trace from the seismic data for each desired trace in the selected set of traces.

7. The method of claim 6, wherein the applied filter is a median filter.

8. The method of claim 6, wherein the determining a best fitting trace comprises minimizing a difference Φ in a weighted sum of differences in common midpoint x and y positions $x^{CMP}$ and $y^{CMP}$, offset h, and azimuth φ between the best fitting and desired traces.

9. The method of claim 8, wherein the minimizing a difference Φ comprises applying the following equation:

$$\Phi = \alpha|x_b^{CMP} - x_d^{CMP}| + \alpha|y_b^{CMP} - y_d^{CMP}| + \beta|h_b - h_d| + \epsilon|\phi_b - \phi_d|,$$

where α, β and ε are user-defined weights, and subscripts b and d denote best fitting and desired traces, respectively.

10. The method of claim 8, wherein the minimizing a difference Φ comprises applying the following equation:

$$\Phi = \alpha|x_b^{CMP} - x_d^{CMP}| + \alpha|y_b^{CMP} - y_d^{CMP}| + \beta|h_b - h_d|$$

where α and β are user-defined weights, and subscripts b and d denote best fitting and desired traces, respectively.

11. The method of claim 1, wherein the calculating a dip-based correction comprises: calculating a dip-based correction for the best fitting trace and the corresponding desired trace, based upon half-offset, azimuth, arrival time, velocity, common midpoint coordinates, dip, and dip direction.

12. The method of claim 11, wherein the calculating a dip-based correction for azimuth differences comprises applying the following equation:

$$\Delta t_\phi = -\frac{2h'^2}{v^2 t_d}\sin^2(\psi)\sin(\phi_b - \phi_d)\sin(\phi_b + \phi_d - 2\theta),$$

where h' is half-offset, v is velocity of the medium, t is arrival time, ψ is dip angle, φ is source-receiver azimuth, θ is dip direction and subscripts b and d denote best fitting and desired traces, respectively.

13. The method of claim 11, wherein the calculating a dip-based correction for offset differences comprises applying the following equation:

$$\Delta t_h = \frac{2}{v^2 t_d} 2h'_d \Delta h' \sin^2(\psi) \cos^2(\phi_d - \theta),$$

where v is velocity of the medium, t is arrival time, h' is half-offset, $\Delta h' = h'_b - h'_d$ is the difference in half-offsets, $\psi$ is dip angle, $\phi$ is source-receiver azimuth, and $\theta$ is dip direction subscripts b and d denote best fitting and desired traces, respectively.

14. The method of claim 11, wherein the calculating a dip-based correction for midpoint differences comprises applying the following equation:

$$\Delta t_{cmp} = \left| \frac{2\sin(\psi)}{v} \right| (\Delta x^{cmp} \cos(\theta) + \Delta y^{cmp} \sin(\theta)),$$

where v is velocity, $\psi$ is dip angle, $\Delta x^{cmp} = x_b^{cmp} - x_d^{cmp}$ is the difference in the x coordinate between common midpoint locations, $\Delta y^{cmp} = y_b^{cmp} - y_d^{cmp}$ is the difference in the y coordinate between common midpoint locations, $\theta$ is dip direction and subscripts b and d denote best fitting and desired traces, respectively.

15. The method of claim 11, wherein the calculating a dip-based correction for midpoint differences comprises applying the following equation:

$$\Delta t_{cmp} = \frac{4\sin(\psi)}{v^2 t_d} \sqrt{\frac{v^2 t_d^2}{4} + h'^2 \sin^2(\psi) \cos^2(\phi_d - \theta)} \, (\Delta x^{CMP} \cos(\theta) + \Delta y CMP \sin(\theta)),$$

where $\psi$ is dip angle, v is velocity, t is arrival time, h' is half-offset, $\phi$ is source-receiver azimuth, $\Delta x^{cmp} = x_b^{cmp} - x_d^{cmp}$ is the difference in the x coordinate between common midpoint locations, $\Delta y^{cmp} = y_b^{cmp} - y_d^{cmp}$ is the difference in the y coordinate between common midpoint locations, $\theta$ is dip direction and subscripts b and d denote best fitting and desired traces, respectively.

* * * * *